United States Patent [19]
Ahonen

[11] 3,781,167
[45] Dec. 25, 1973

[54] NO-WELD REFRACTORY COVERING FOR WATER COOLED PIPES

[75] Inventor: George Harvey Ahonen, Welland, Ontario, Canada

[73] Assignee: Combustion Engineering, Inc., Windsor, Conn.

[22] Filed: Nov. 29, 1972

[21] Appl. No.: 310,312

[52] U.S. Cl. .............................................. 432/234
[51] Int. Cl. ............................................ F27b 9/14
[58] Field of Search ................... 432/233, 234, 252

[56] References Cited
UNITED STATES PATENTS

| 3,202,486 | 8/1965 | Versluis ........................ 432/252 X |
| 3,329,414 | 7/1967 | Greaney ......................... 432/234 |
| 3,647,194 | 3/1972 | Brungraber et al. ............... 432/234 |

*Primary Examiner*—John J. Camby
*Attorney*—Eldon H. Luther et al.

[57] ABSTRACT

An insulating jacket for water cooled pipes which can be quickly and easily installed.

6 Claims, 4 Drawing Figures

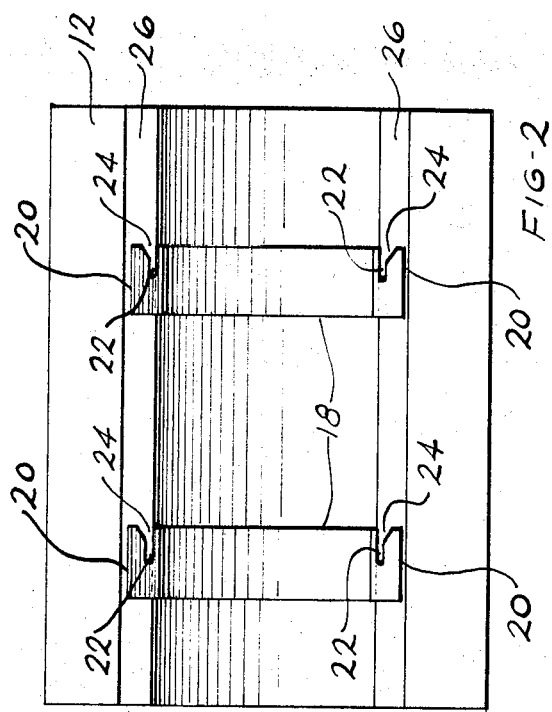
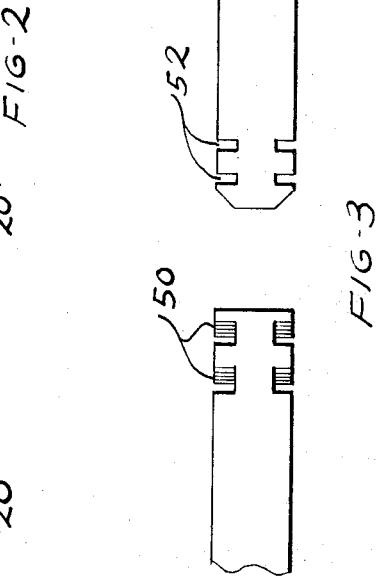
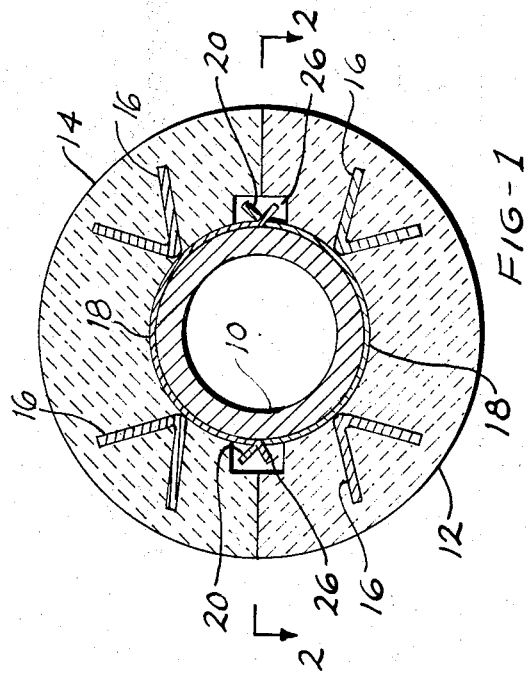
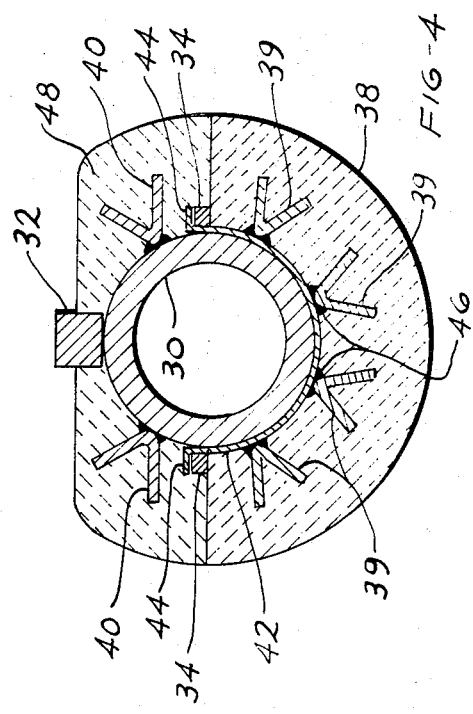

NO-WELD REFRACTORY COVERING FOR WATER COOLED PIPES

BACKGROUND OF THE INVENTION

In heat treating furnaces, skid rails and structural water cooled pipes are used for supporting the metal workpieces during the heat treating operation. In order to minimize heat loss from the furnace by the cooling water, the pipes are provided with suitable insulating jackets of ceramic or refractory material. The average life of the insulating jackets is relatively short, and thus the furnaces must be regularly shut down for replacement or repair of the insulation.

SUMMARY OF THE INVENTION

The reinforced insulating jackets of the present invention are made in semi-cylindrical segments which are precast. These segments can be quickly and easily assembled to form a complete insulating sleeve by means of interlocking metallic bands which are integrally cast with the ceramic material.

BRIEF DESCRIPTION OF THE DRAWING

FIG. 1 is a cross sectional view of a reinforced insulating jacket for a pipe constructed in accordance with the invention;

FIG. 2 is a view taken on line 2—2 of FIG. 1 with the pipe being omitted;

FIG. 3 shows an alternative locking arrangement from that shown in FIGS. 1 and 2; and FIG. 4 is a cross sectional view of a reinforced insulating arrangement which is applied to a pipe having a skid rail attached thereto.

DESCRIPTION OF THE PREFERRED EMBODIMENT

Referring to FIGS. 1 and 2, 10 denotes a water cooled support pipe which is exposed to heat from the outside, for example, a structural pipe which is exposed to heat from the outside, for example, a structural pipe to be used in a heat treating furnace. The insulating sleeve or jacket is comprised of a lower semi-cylindrical ceramic member 12, and an upper semi-cylindrical ceramic member 14. Integrally cast within the ceramic material are a plurality of reinforcing or anchoring members 16. These members are V-shaped, and are made of stainless steel. Welded to the bottoms of the anchoring members are stainless steel bands or strips 18, which lie on the interior surface of members 12 and 14.

The two ends of each strip 18 contain tabs 20, which are bent outwardly at a 45° angle. Slots 20 are located at the bends. Longitudinal grooves 26 are formed in the ceramic members 12 and 14, and provide a space for the tabs 20 when the segments are in their assembled position. The slots 22 have enlarged mouths 24 for a purpose explained below.

When a pipe is to be insulated, the two halves or semi-cylindrical members 12 and 14 are positioned on opposite sides of the pipe with the slots 22 in the bands 18 facing each other. The two halves are initially placed so they are slightly offset longitudinally. They are then slid into alignment, causing the slots to engage, and intermesh. The enlarged mouths 24 of these slots aid the initial engagement and alignment. Each of the segments 12 and 14 are approximately 6 inches long. After one section has been secured, two more halves are assembled on the pipe, and so on, until the pipe is completely jacketed.

By use of the above insulating jacket, the time required for installation is very short. Thus in a heat treating furnace, very little time is required to put new insulation on the structural support pipes for the skid rail. The ceramic segments can be precast at a manufacturing plant. The manner of manufacturing the segments is to initially weld two stainless steel straps to the bottoms of a plurality of vee anchors (two as shown in FIGS. 1 and 2). The strips are then bent into semi-cylindrical shape, and placed into a mold or form. Then, either hydraulic setting castable refractories or wet air setting plastic refractories are installed in the form. The segments are then cured or fired as required, depending on the refractory material.

FIG. 3 shows an alternative arrangement for securing two ceramic halves together. The strips or bands 48 of this embodiment instead of having slots which intermesh, have bent tabs 50 which lock into slots 52. To interlock this type, instead of sliding the two ceramic halves longitudinally to intermesh the slots, the halves are originally positioned diametrically opposite each other on opposite sides of a pipe, being slightly spaced from the pipe. They are then moved radially inwardly, until the ends of bent tabs 50 drop into the slots 52. Release of the members then causes them to locked together, along with the ceramic members to which they are attached in the same manner as shown in FIGS. 1 and 2.

FIG. 4 shows an insulating arrangement to be used on skid rails. A skid rail pipe 30 having an upper skid rail 32 on which metal workpieces being heat treated can be supported, has bars 34 welded on opposite sides thereof. These bars have slots 36 which are longitudinally spaced 1½ apart. The ends of strips 42 are passed through these slots and bent over locking the precast ceramic member 38 in place. This member is reinforced by metallic vee anchors 39, just as in the other embodiments. Additional vee anchors 40 can then be welded to the pipe 30, if desired. Refractory material 44 is then poured over these vee anchors 40, completing the insulation. The V-shaped anchors perform the important function of holding most of the ceramic in place, in the event there is some cracking or breaking of a segment during operation.

What is claimed is:

1. A reinforced insulating jacket for a pipe, including a first semi-cylindrical ceramic member, a second semi-cylindrical ceramic member, a plurality of metallic members embedded in each of said first and second ceramic members, each of the metallic members having a portion which is exposed on the inner surfaces of the first and second ceramic members, a first semi-cylindrical metallic band secured to some of the metallic members and positioned on the inner surface of the first ceramic member, a second coacting semi-cylindrical metallic band secured to some of the metallic members and positioned on the inner surface of the second ceramic member, the first and second ceramic members each having longitudinal grooves extending along their inner edges on both sides, the first and second metallic bands each having interlocking means near both ends, which interlocking means are adjacent the grooves in the ceramic members, the interlocking means in the metallic bands being so positioned that when the first and second ceramic members are positioned around a supporting pipe the interlocking means in the metallic bands engage each other, interlocking the first and second ceramic members around the supporting pipe to thereby form a cylindrical insulating jacket therefor.

2. The reinforced insulating jacket of claim 1, wherein the plurality of metallic members are V-shaped, with the bottom portion of the V-shaped members being exposed on the inner surfaces of the first and second ceramic members.

3. The reinforced insulating jacket of claim 2, wherein the first and second metallic bands are secured to the metallic members by welding.

4. The reinforced insulating jacket of claim 2, wherein there are a plurality of coacting semi-cylindrical metallic bands similar to said first and second metallic bands, secured to each of said first and second ceramic members.

5. The reinforced insulating jacket of claim 2, wherein the interlocking means of the metallic bands are slots, which slots can be intermeshed by initially positioning the first and second ceramic members on opposite sides of a pipe in a longitudinally offset position, and sliding the ceramic members longitudinally towards each other to cause the slots to intermesh.

6. The reinforced insulating jacket of claim 2, wherein the mouths of the slots are enlarged, to make for ease of engagement when the first and second ceramic members are slid towards each other.

* * * * *